United States Patent
Fujiki

(10) Patent No.: US 7,310,500 B2
(45) Date of Patent: *Dec. 18, 2007

(54) EMERGENCY NOTIFICATION DEVICE IN RADIO COMMUNICATION APPARATUS

(75) Inventor: Shiro Fujiki, Yokohama (JP)

(73) Assignee: Vertex Standard Co., Ltd., Tokyo (JP)

( * ) Notice: Subject to any disclaimer, the term of this patent is extended or adjusted under 35 U.S.C. 154(b) by 354 days.

This patent is subject to a terminal disclaimer.

(21) Appl. No.: 10/368,326

(22) Filed: Feb. 18, 2003

(65) Prior Publication Data

US 2003/0157924 A1    Aug. 21, 2003

(30) Foreign Application Priority Data

Feb. 19, 2002    (JP)    ............................ 2002-040974

(51) Int. Cl.
  H04B 1/38    (2006.01)
  H04M 11/04    (2006.01)
(52) U.S. Cl. .................. 455/90.1; 455/90.2; 455/404.1
(58) Field of Classification Search ............... 455/90.1, 455/90.2, 404.1, 404.2, 66.1, 67.11
See application file for complete search history.

(56) References Cited

U.S. PATENT DOCUMENTS

| | | | | |
|---|---|---|---|---|
| 5,298,883 A | * | 3/1994 | Pilney et al. | ............. 340/573.2 |
| 5,734,320 A | * | 3/1998 | Suzuki | ....................... 340/473 |
| 6,173,169 B1 | * | 1/2001 | Oh | ........................... 455/404.1 |
| 6,188,891 B1 | * | 2/2001 | Fujiki et al. | ................. 455/421 |
| 6,484,021 B1 | * | 11/2002 | Hereford et al. | ......... 455/404.1 |

* cited by examiner

*Primary Examiner*—Duc M. Nguyen
*Assistant Examiner*—Un C. Cho
(74) *Attorney, Agent, or Firm*—Fulwider Patton LLP

(57) ABSTRACT

When an emergency button 8a of a radio communication apparatus has been turned ON and a transmit mode button 8b has been depressed, an MCU 11 sets frequencies of a receiving section 2 and a transmitting section 3 to an emergency communication frequency. The MCU 11 also causes an indicator lamp 10 to illuminate or flash at peak intensity, and causes a burst sound to be supplied from a loudspeaker 6 at the maximum volume. Then, the MCU 11 causes a built-in timer to measure a given time period while resetting the timer whenever a reception/transmission switching operation is performed or a communicating signal is detected. While the timer measures the time period, the MCU 11 causes the indicator lamp 10 to be turned off. When a timer expiration is detected, the MCU 11 causes the indicator lamp 10 to be turned on or flashed again.

6 Claims, 3 Drawing Sheets

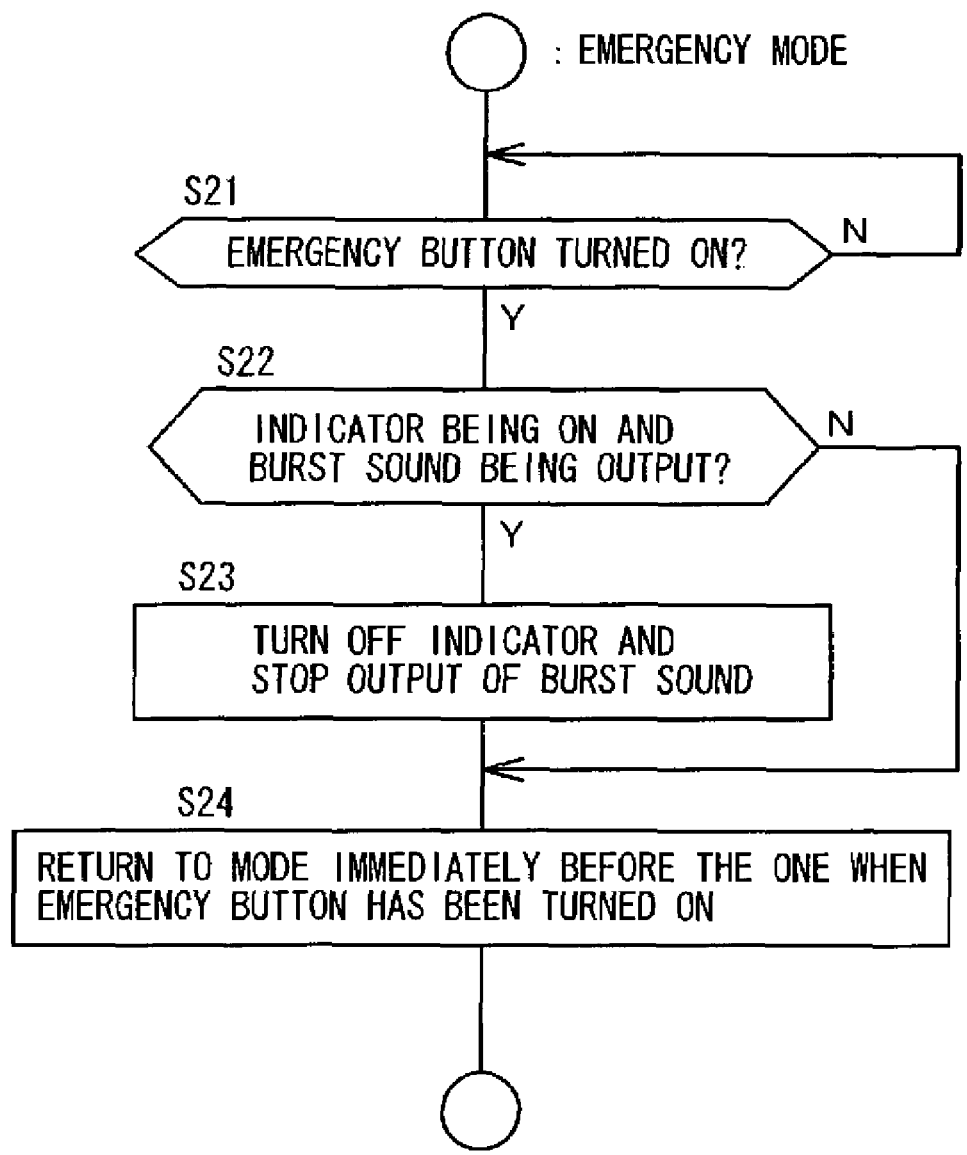

EMERGENCY NOTIFICATION DEVICE IN RADIO COMMUNICATION APPARATUS

BACKGROUND OF THE INVENTION

1. Field of the Invention

The present invention belongs to a technical field for a radio communication apparatus, and relates to an emergency notification device in the radio communication apparatus, by which a user of the radio communication apparatus notifies his position through the use of an indicator lamp therein, as well as performs essential emergency communication, when he has encountered an emergency situation such as an accident.

2. Description of the Related Art

When encountering an emergency such as a disaster, radio communication apparatus users have to voluntarily notify a lot of other radio communication apparatus users of the emergency situation.

In the case of amateur radio communication, in particular, it is recommended that a communicating frequency being in use be switched to a CALL frequency specified in each of communication frequency bands, thereby fulfilling the above-mentioned duty.

Since the frequencies of a lot of radio communication apparatuses in a call waiting state other than radio stations being in communication are set to the CALL frequency, emergency information will be widely notified. For this reason, this switching is performed.

The Japan Amateur Radio League, Inc. (JARL) designates CALL frequencies as emergency communication frequencies in VHF and UHF frequency bands for FM communication, for example. In the case of a 144 MHz frequency band, 145.00 MHz is designated as a main frequency, while 145.50 MHz is designated as a sub frequency. In the case of a 430 MHz frequency band, 433.00 MHz is designated as the main frequency, while 433.50 MHz is designated as the sub frequency.

The inventor of the present invention proposes the following radio communication apparatuses for the emergency communication:

(1) A radio-communication apparatus of U.S. Pat. No. 2,926,490, where an emergency control button is provided. In this radio communication apparatus, depression of the emergency control button when an emergency has occurred during communication at a communicating frequency or in the call waiting state causes an emergency mode to be set. Then, an emergency control code is transmitted, and automatic switching to the emergency communication frequency is also performed. On the other hand, when the emergency control code has been received, automatic transition to an emergency communication mode is performed.

In a radio communication network that uses radio communication apparatuses of this type, when a single radio communication apparatus sets the emergency mode to transmit the emergency control code, a radio communication apparatus being in communication with the radio communication apparatus or other radio communication apparatuses in the call waiting state are also switched to the emergency mode. Thus, a smooth transition to communication at the emergency communication frequency can be made in the emergency.

(2) A radio communication apparatus disclosed in Japanese Patent Unexamined Publication HEI11-8561 where an emergency mode start key is provided. In this radio communication apparatus, depression of the emergency mode start key in the case of an emergency causes a warning burst sound to be output at the maximum level from a loudspeaker. In addition, during transmission, a carrier wave of a transmitting frequency is modulated by the warning burst sound for transmission.

According to this radio communication apparatus, by superimposition of the burst sound on a received sound of the emergency communication frequency, occurrence of the emergency can be notified to radio communication users. Further, people at locations close to this radio communication apparatus, where the sound can reach, can be directly notified of the emergency by the burst sound. Accordingly, even when the owner of the radio communication apparatus cannot make a voice for help when involved in a disaster, the position of the owner can be identified by the burst sound, so that a rescue and lifesaving operation can be performed promptly.

As emergencies encountered by the owner of the radio communication apparatus, it often happens that the owner has got lost in woods at night or navigation at sea at night has become impossible.

In such emergencies, a radio communication apparatus as a method of asking for help is effective in notifying the emergencies and situations with regard to the emergencies. However, it often happens that notification of the position of the owner of the radio communication apparatus is difficult; that is, in most cases, there is no target object around the radio communication apparatus. Thus, unless the radio communication apparatus is equipped with a Global Positioning System (GPS), it is difficult for the owner to exactly clarify his position.

On contrast therewith, according to the notification unit disclosed in the invention in Japanese Patent Application HEI11-8561, which causes the burst sound to be outputted from the loudspeaker, a search operation can be performed using the sound-outputting location as the target object.

However, the volume of the sound that can be output from the radio communication apparatus is small, in general. Thus, though depending on surrounding conditions, an extent where the burst sound can reach is on the order of just several meters. In the radio communication apparatus such as a hand-held transceiver in particular, the extent becomes extremely small.

Accordingly, the radio communication apparatus may be effective as a notification unit in the case where a building fell down and was destructed due to an earthquake or the like, and the owner of the radio communication apparatus has been confined within the building. The radio communication apparatus, however, is not so effective in the case where an emergency as described above has been encountered.

SUMMARY OF THE INVENTION

Generally, the radio communication apparatus is equipped with an indicator lamp for explicitly demonstrating a reception/transmission state by emitting a red color light during transmission and emitting a green color light during reception.

The present invention has been made in view of the problems described above, and it is an object of the present invention to provide a radio communication apparatus including an emergency notification device that uses an indicator lamp, by which an owner of the apparatus can exactly notify his position when he has encountered an emergency as described above.

An emergency notification device in a radio communication apparatus including an indicator lamp, according to the present invention comprises:

an emergency mode button for setting an emergency mode;

frequency switching means for switching reception and transmission frequencies to an emergency communication frequency when the emergency mode is set;

signal detection means for detecting a presence or absence of a communicating signal while the emergency mode is set;

timer means for measuring a given time period, the timer means being reset whenever a reception/transmission switching signal is detected or the communicating signal is detected by the signal detection means while the emergency mode is set; and lamp controlling means for turning on or flashing the indicator lamp when the emergency mode is set, turning off the indicator lamp while the timer means measures the time period, and turning on or flashing the indicator lamp when expiration of the timer means is detected.

According to the present invention, when the emergency mode is set, the communicating frequency is set to the emergency communication frequency by the frequency switching means, and the lamp controlling means sets the indicator lamp to be turned on or turned off.

The distance light reaches is by far longer than the distance the burst sound reaches. Thus, when the owner of this transceiver has got lost in woods as night or navigation at sea has become impossible at night, he can properly notifies his position through the illumination of the indicator lamp.

Using the timer means, the lamp controlling means turns off the indicator lamp while communication at the emergency communication frequency is performed, and turns on the indicator lamp again or flashes the indicator lamp when communication has not been performed for the given time period.

While a reception/transmission switching operation or communication is performed, the safety of the owner is confirmed. On the other hand, while communication is performed, the owner performs transmission or hearing near the microphone or the loudspeaker. The light of the indicator lamp is thereby shielded. Thus, it is more rational to turn off the indicator lamp to reduce power dissipation. For the reasons described above, the above-mentioned arrangement of turning off and turning on the indicator lamp is performed. On the other hand, when communication has not been performed for the given time period, the conditions described above become lost. Thus, the indicator lamp is returned to the previous on state or flashing state, thereby maintaining emergency notification through light.

In the present invention, a notification method using the burst sound may also be used in combination with the indicator lamp. That is, a burst sound producing unit is provided. When the emergency mode is set, the burst sound is output from the loudspeaker. While the timer means measures the time period, output of the burst sound is stopped. When a timer expiration is detected, the burst sound is output. With this arrangement, the burst sound is produced in synchronization with illumination or flashing of the indicator lamp.

When a rescuer comes relatively close to the owner of this transceiver, who has got lost in the woods, the concurrent use of the burst sound and the indicator lamp sometimes becomes effective.

Further, by the output/stop control by the burst sound producing unit, the burst sound does not interfere with communication.

Still further, it is natural that the indicator lamp should be illuminated or flashed at peak intensity in the emergency mode. In the indicator lamp of a type of which a plurality of LEDs having different colors are individually illuminated, for example, all the LEDs are illuminated using the maximum current.

Still further, if flashing control of the indicator lamp is executed under a flashing condition associated with signal information such as an "SOS" translated to Morse code and a call sign of the amateur radio station assigned to the owner, notification in the emergency state and who performs notification can be clarified.

The various features of novelty which characterize the invention are pointed out with particularity in the claims annexed to and forming a part of this specification. For a better understanding of the invention, its operating advantages, and specific objects attained by its use, reference should be had to the accompanying drawing and descriptive matter in which there is illustrated and described a preferred embodiment of the invention.

BRIEF DESCRIPTION OF THE DRAWINGS

FIG. 4 is a flowchart showing a procedure for canceling the emergency mode;

DETAILED DESCRIPTION OF THE PREFERRED EMBODIMENT

Figure 1:
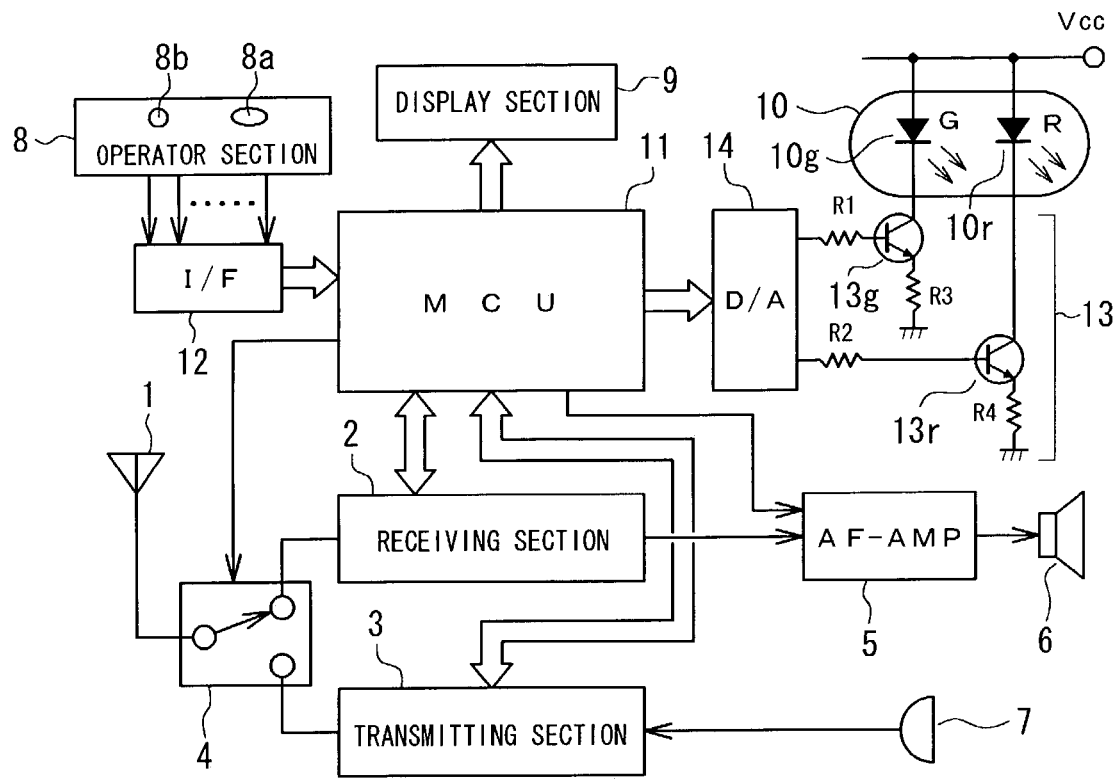
FIG. 1 is a system circuit diagram of a hand-held transceiver according to an embodiment of the present invention.

First, FIG. 1 is a system circuit diagram of a hand-held transceiver.

Referring to FIG. 1, reference numeral 1 denotes an antenna, reference numeral 2 denotes a receiving section, reference numeral 3 denotes a transmitting section, reference numeral 4 denotes a switching circuit for performing switching between the receiving section 2 and the transmitting section 3 in a receive/transmit mode, for connection to the antenna 1, reference numeral 5 denotes a low-frequency amplifier, reference numeral 6 denotes a loudspeaker, reference numeral 7 denotes a microphone, reference numeral 8 denotes an operator section, reference numeral 9 denotes a liquid crystal display section, reference numeral 10 denotes an indicator lamp, reference numeral 11 denotes a Micro Controller Unit (MCU) for controlling an entire system, reference numeral 12 denotes an input interface of the operator section 8 for the MCU 11, reference numeral 13 denotes drive circuits for the indicator lamp 10, and reference numeral 14 denotes a D/A converter.

The MCU 11 controls the connection state of the switching circuit 4 according to the receive/transmit mode set through the operator section 8, thereby allowing communication in each of the receive and transmit modes. The MCU 11 also controls the illumination color of the indicator lamp 10 through the D/A converter 14.

The indicator lamp 10 is constituted by a green LED 10g and a red LED 10r. In the transmit mode, the MCU 11 causes only a drive circuit 13g for the LED 10g to be driven, thereby causing the indicator lamp 10 to illuminate green. In the receive mode, the MCU 11 causes only a drive circuit 13r for the LED 10r to be driven, thereby causing the indicator lamp 10 to illuminate red.

Figure 2:
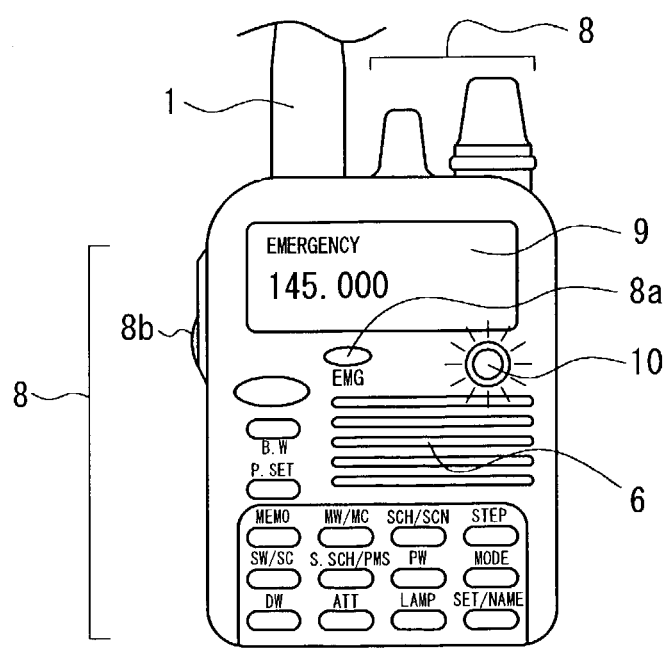
FIG. 2 is a front view of the hand-held transceiver.

Though the circuit configuration and the basic function of the transceiver and the light emission control function of the indicator lamp 10 are common ones, the hand-held transceiver in this embodiment has the following features:

(1) An emergency button 8a for setting an emergency mode is provided for the operator section 8. Illustratively stated, the layout of the front panel surface of this hand-held transceiver is as shown in FIG. 2. The emergency button 8a is provided below the liquid crystal display section 9 in such a manner that it is separated from other operation buttons.

(2) In a ROM included in the MCU 11, a control program for the emergency mode is stored, together with a control program for a normal communication mode. Based on the control program for the emergency mode, the light emission control of the indicator lamp and the output control of a burst sound in the emergency mode are executed.

A button 8b provided on the side of the housing of the transceiver in FIG. 2 is a transmit mode button. When the button is turned ON, the MCU 11 sets the system of the transceiver to the transmit mode. While on the other hand, when the button is turned OFF, the MCU 11 sets the system to the receive mode.

Figure 3:
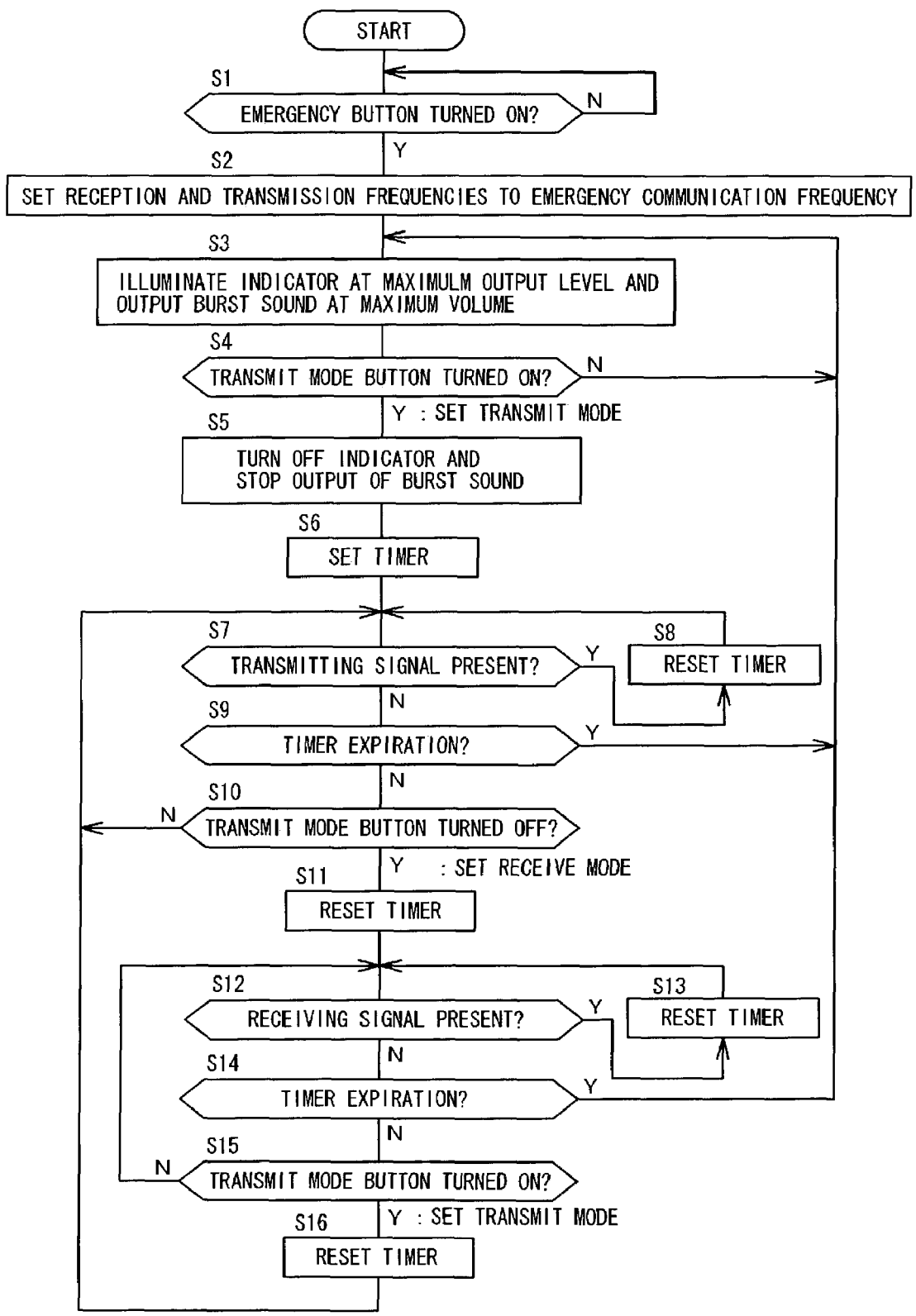
FIG. 3 is a flowchart showing a control procedure in an emergency mode.

A control procedure in the emergency mode is shown in flowcharts in FIGS. 3 and 4.

First, when the owner of this hand-held transceiver asks for rescue in an emergency, he turns ON the emergency button 8a in step S1.

The MCU 11, which has confirmed the ON signal, immediately sets the emergency mode and then activates the control program in the emergency mode. Then, the MCU 11 sets the transmission frequency of the transmitting section 3 and the reception frequency of the receiving section 2 to an emergency communication frequency such as 145.000 MHz in step S2.

Further, the MCU 11 brings the drive circuit 13g for the LED 10g and the drive circuit 13r for the LED 10r into conduction through the D/A converter 14, thereby causing the indicator lamp 10 to illuminate at the maximum output level. Further, the MCU 11 causes a burst sound signal to be supplied to the low-frequency amplifier 5, thereby causing a burst sound to be outputted from the loudspeaker 6 at the maximum volume, in step S3.

This state lasts as long as the transmission button 8b is not depressed.

When the transmission button 8b has been depressed and turned ON in step S4, on the other hand, the MCU 11 sets the system to the transmit mode. In step S5, the MCU 11 also brings the drive circuits 13g and 13r out of conduction, thereby turning OFF the indicator lamp 10. Further, the MCU 11 stops supply of the burst sound signal, thereby stopping output of the burst sound.

The MCU 11 also sets a built-in timer to measure the period of time elapsed after the transmit mode has been set, in step S6.

Whenever a transmitting signal is detected from the transmitting section 3, the MCU 11 resets the timer so that the timer resumes counting, in steps S7 and S8. When a given time period such as 10 second is measured by the timer, the MCU 11 regards it as a timer expiration, resumes turning ON the indicator lamp 10 and outputting the burst sound, in steps S9 and S3.

On the other hand, if depression of the transmit mode button 8b is released before the timer expiration and then turned OFF, the MCU 11 switches the system to the receive mode and resets the timer, thereby resuming counting in the same manner as described above, in steps S10 and S11.

Then, in the receive mode as well, the MCU 11 resets the timer whenever a receiving signal is detected from the receiving section 2, in steps S12 and S13. When the given time period is measured by the timer, the MCU 11 regards it as the timer expiration, and resumes turning ON the indicator lamp 10 and outputting the burst sound, in steps S14 and S3.

When the transmit mode button 8b is turned ON in the receive mode before the timer expiration, the MCU 11 switches the system back to the transmit mode and resets the timer, in steps S15 and S16. While the emergency mode is set, control steps from steps S7 to S16 are thereafter repeated, in steps S16 and S7.

Assume the emergency button has been turned ON again while the emergency mode is set, in step S21, as shown in FIG. 4. If the indicator lamp 10 is ON and output of the burst sound is being performed at that point in step S22, the MCU 11 turns OFF the indicator lamp 10 and stops output of the burst sound in step 23. Then, the MCU 11 returns the system to the mode immediately before the one in which the emergency button has been first turned ON, in step 24. If the indicator lamp 10 is OFF and output of the burst sound is not being performed at that point in step S22, the MCU 11 returns the system to the mode immediately before the one in which the emergency button has been first turned ON with the states of the indicator lamp 10 and the burst sound remaining unchanged, in step S24.

According to the operation procedure described above, when the emergency mode has been set, the indicator lamp 10 is turned ON and illuminated at the maximum output level, and the burst sound is also output at the maximum volume from the loudspeaker. If communication is then performed in the transmit and receive modes, however, the indicator lamp 10 is turned OFF and output of the burst sound is stopped.

Further, if communication is not performed for the given time period, the indicator lamp 10 is automatically turned ON again, and output of the burst sound is automatically resumed.

Accordingly, when the owner of this hand-held transceiver has got lost in the woods at night or navigation has become impossible at sea at night, by depressing the emergency button 8a first to set the emergency mode and then orienting the front surface of the transceiver housing in various directions, he can notify his position through the illumination of the indicator lamp 10. Then, if the transmit mode button 8b is turned ON for transmission, the owner of this hand-held transceiver can clarify the situation to other radio communication apparatus in the call waiting state at the emergency communication frequency and can also ask for rescue.

If there is a response from other radio communication apparatus, communication at the emergency communication frequency becomes possible by turning ON/OFF of the transmit mode button 8b. Further, even in the case where transmission or operation of the transmit mode button 8b has become impossible due to an injury to the owner or the like, the indicator lamp 10 is automatically turned ON again after the given time period. Thus, the owner can keep on notifying a rescuer of his position.

In order to intentionally keep on illumination of the indicator lamp 10 and output of the burst sound, the transmit mode button 8b should be kept from operating after the timer expiration or turning ON the emergency button 8a should be performed twice.

In this embodiment, as a method of notifying an emergency, concurrent use of turning ON the indicator lamp 10 and output of the burst sound is employed. Only the indicator lamp 10 can also be employed for notification.

In this embodiment, the indicator lamp 10 is just illuminated at the maximum output level. The indicator lamp 10 may also be flashed. In this case, significant information can be conveyed.

If an "SOS" spelled out in Morse code is employed in the form of flashing information, asking for rescue by the owner of the transceiver can be notified. Alternatively, if a call sign of the amateur radio station assigned to the owner is translated to Morse code, the person who sent this sign can be identified and notified. The Morse code indicating both the "SOS" and the call sign may also be employed, as a matter of course.

What is claimed is:

1. An emergency notification device in a radio communication apparatus including an indicator lamp, comprising:
    an emergency mode button for setting an emergency mode;
    frequency switching means for switching reception and transmission frequencies to an emergency communication frequency when said emergency mode is set;
    signal detection means for detecting a presence or absence of a communicating signal while said emergency mode is set;
    timer means for measuring a given time period, said timer means being reset whenever a reception/transmission switching signal is detected or the communicating signal is detected by said signal detection means while said emergency mode is set; and
    lamp controlling means for turning on or flashing said indicator lamp when said emergency mode is set, turning off said indicator lamp while said timer means measures the time period, and turning on or flashing said indicator lamp when expiration of said timer means is detected.

2. The emergency notification device in the radio communication apparatus according to claim 1, further comprising:
    burst sound producing means for outputting a burst sound from a loudspeaker when said emergency mode is set, stopping output of the burst sound while said timer means measures the time period, and outputting the burst sound when expiration of said timer means is detected.

3. The emergency notification device in the radio communication apparatus according to claim 1, wherein said lamp controlling means illuminates or flashes said indicator lamp at peak intensity in said emergency mode.

4. The emergency notification device in the radio communication apparatus according to claim 1, wherein flashing control over said indicator lamp by said lamp controlling means is executed according to a flashing condition associated with signal information for emergency notification.

5. An emergency notification device comprising:
    a microphone for communicating voice messages during a communication mode;
    a beacon for visually alerting searchers of a location of the emergency notification device;
    a timer for turning on said beacon after a predetermined period after a use of said microphone;
    an emergency mode button for switching from a two-way voice communication mode to an emergency mode;
    frequency switching means for switching a first frequency used during said two-way voice communication to a second frequency used in said emergency mode; and
    an alarm generator programmed to issue a sound burst upon expiration of a predetermined period after a reception or a transmission of a voice communication.

6. A method for notifying a search party of the whereabouts of an emergency device comprising:
    providing a two-way radio communication device for communicating vocally between said emergency device and said search party;
    activating a separate emergency mode for said communication device;
    automatically switching to an emergency frequency upon activation of said emergency mode;
    conducting two-way communication between said search party and said emergency device at said emergency frequency in said emergency mode;
    initiating a timer after each communication in said emergency mode;
    activating an audio signaling generator upon expiration of said timer; and
    interrupting said audio signal generator upon subsequent communication in said emergency mode.

* * * * *